United States Patent [19]
Föhl

[11] Patent Number: 5,066,042
[45] Date of Patent: Nov. 19, 1991

[54] BELT LOCK FOR A SAFETY BELT SYSTEM PROVIDED WITH A TIGHTENING MEANS

[75] Inventor: Artur Föhl, Schorndorf, Fed. Rep. of Germany

[73] Assignee: TRW Repa GmbH, Alfdorf, Fed. Rep. of Germany

[21] Appl. No.: 574,749

[22] Filed: Aug. 29, 1990

[30] Foreign Application Priority Data

Sep. 1, 1989 [DE] Fed. Rep. of Germany ....... 3929114

[51] Int. Cl.$^5$ ............ B60R 22/46; B60R 22/18; B60R 22/16; A44B 11/18
[52] U.S. Cl. ............................ 280/806; 297/480
[58] Field of Search ............... 280/806; 24/633, 640, 24/641, 642, 645; 297/480

[56] References Cited

U.S. PATENT DOCUMENTS

| | | | |
|---|---|---|---|
| 4,422,669 | 12/1983 | Chiba et al. | 280/806 |
| 4,508,287 | 4/1985 | Nilsson | 280/806 |

FOREIGN PATENT DOCUMENTS

| | | | |
|---|---|---|---|
| 2023859 | 11/1971 | Fed. Rep. of Germany. | |
| 2720713 | 9/1978 | Fed. Rep. of Germany. | |
| 7802629 | 11/1979 | Fed. Rep. of Germany. | |
| 2828049 | 1/1980 | Fed. Rep. of Germany. | |
| 3533684 | 2/1987 | Fed. Rep. of Germany | 24/633 |
| 3718117 | 12/1988 | Fed. Rep. of Germany | 280/806 |
| 1589059 | 5/1981 | United Kingdom | 24/642 |

Primary Examiner—Kenneth R. Rice
Attorney, Agent, or Firm—Tarolli, Sundheim & Covell

[57] ABSTRACT

A belt lock for a safety belt system provided with a tightening means operative between the belt lock and an anchoring point on the vehicle body is provided with a compensation mass which is deflected by a two-armed lever and compensates the inertial forces of the release button and the parts connected thereto.

10 Claims, 4 Drawing Sheets

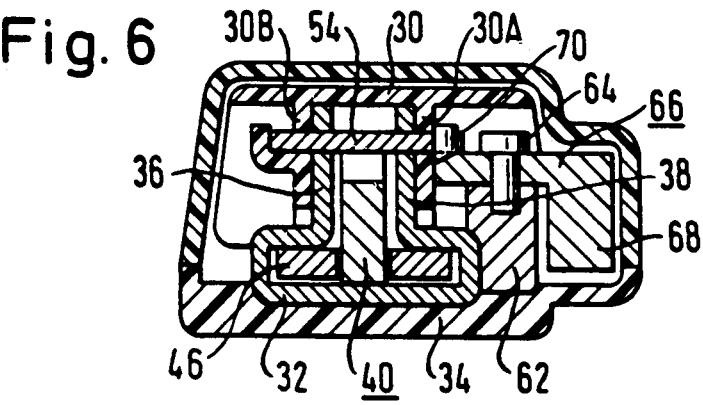
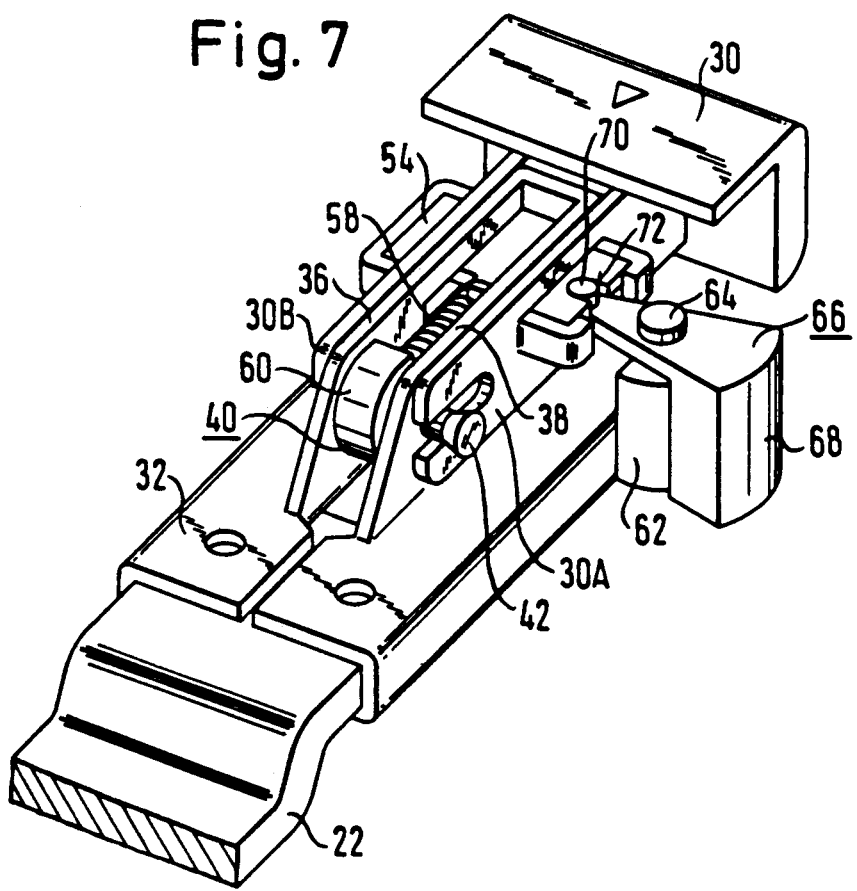

BELT LOCK FOR A SAFETY BELT SYSTEM PROVIDED WITH A TIGHTENING MEANS

The invention relates to a belt lock.

Belt locks for safety belt systems are known in numerous constructions. A constructional form has proved itself in which in the housing of the belt lock a guide path for the insert tongue is formed and a latch displaceably guided on the housing transversely of the guide path or pivotally mounted thereon cooperates with a detent opening of the insert tongue. A blocking member displaceably guided parallel to the guide path in the housing holds the latch in its locking position as long as a release button likewise guided displaceably parallel to the guide path in the housing is in its rest position. The release button is coupled to the blocking member for moving the latter on actuation into a release position in which the latch comes free of the detent opening of the insert tongue.

The use of such a belt lock in safety belt systems having a tightening means does not involve any problems when the tightening force acts for example at the belt retractor. Tightening means have also already been proposed which are operative between the belt lock and its mounting point on the vehicle bodywork or a vehicle seat. Such tightening means shorten the distance between the securing point of the belt lock and the lock itself by a few centimeters, for example 10 cm. The tightening means used in such cases are mechanically constructed and have a force accumulator in the form of a tensioned spring which is released by a sensor responsive to inertial forces and effects a tightening when required.

To make available the necessary tightening force mechanical tightening means require a very strongly dimensioned spring. The vehicle-sensitive release of such a spring at satisfactorily reproduceable release thresholds presents great difficulties.

With a pyrotechnical tightening means comprising as tightening drive a piston/cylinder linear drive having a pyrotechnical gas generator subjecting the piston in the cylinder to pressurized gas when released high tightening forces can be obtained relatively easily. It has however been found that a belt lock of the type mentioned at the beginning tends to open automatically when used in conjunction with such a pyrotechnical tightening means.

The present invention provides a belt lock for a safety belt system provided with a tightening means which is operative between the belt lock and an anchoring point on the vehicle bodywork or on a vehicle seat. This belt lock can be used without any problems in safety belt systems which are equipped with tightening means generating relatively high tightening forces. In order to achieve this, a two-armed lever is pivotally mounted in the housing on a pin perpendicular to the guide path and on the one arm of the lever a compensation mass engages. The other arm of the lever engages in force-transmitting manner the release button or the blocking member. These measures compensate for the mass of the release button and all the parts connected thereto. In the event of tightening the belt lock is moved by the tightening force with extremely high acceleration towards its securing point on the vehicle bodywork or on a vehicle seat. At the end of the tightening travel the belt lock and its securing fitting reach a high velocity, as do the release button of the belt lock and all masses coupled thereto. The travel of the tightening movement is limited for practical reasons so that the securing fitting of the belt lock can strike a stop limiting the tightening travel with high velocity. Due to the mass inertial forces the release button with the masses coupled thereto tends to continue its movement, i.e. a movement in a direction which corresponds to the normal actuation of the release button for opening the belt lock. Under unfavourable circumstances in this process an automatic opening of the belt lock may occur. With the step according to the invention such an automatic opening is however reliably prevented because the inertial forces of the release button and the masses coupled thereto are opposed by a compensating force which is generated by the mass inertia of the compensation mass.

In practical embodiments of the invention the compensation mass is dimensioned so that the inertial forces generated thereby are somewhat greater than those of the release button and the masses coupled thereto. With this step a high functional reliability is achieved which takes account of production tolerances, friction and age-dependent changes and thus prevents an unintentional opening of the belt lock even in the event of a particularly unfavourable constellation of tolerances and outer influences. The compensation mass thus generates in the normal case a counter force to the inertial forces occurring at the release button which is somewhat greater than these inertial forces.

Advantageous further developments of the invention are set forth in the subsidiary claims.

Further features and advantages of the invention will be apparent from the following description of some embodiments of the invention and from the drawings to which reference is made and wherein:

FIG. 6 is a cross-section of the belt lock along the line VI—VI of FIG. 5;

FIG. 7 is a schematic perspective view of the functional parts of the belt lock and FIGS. 8, 9 and 10 show another embodiment of the belt lock.

Figure 1:
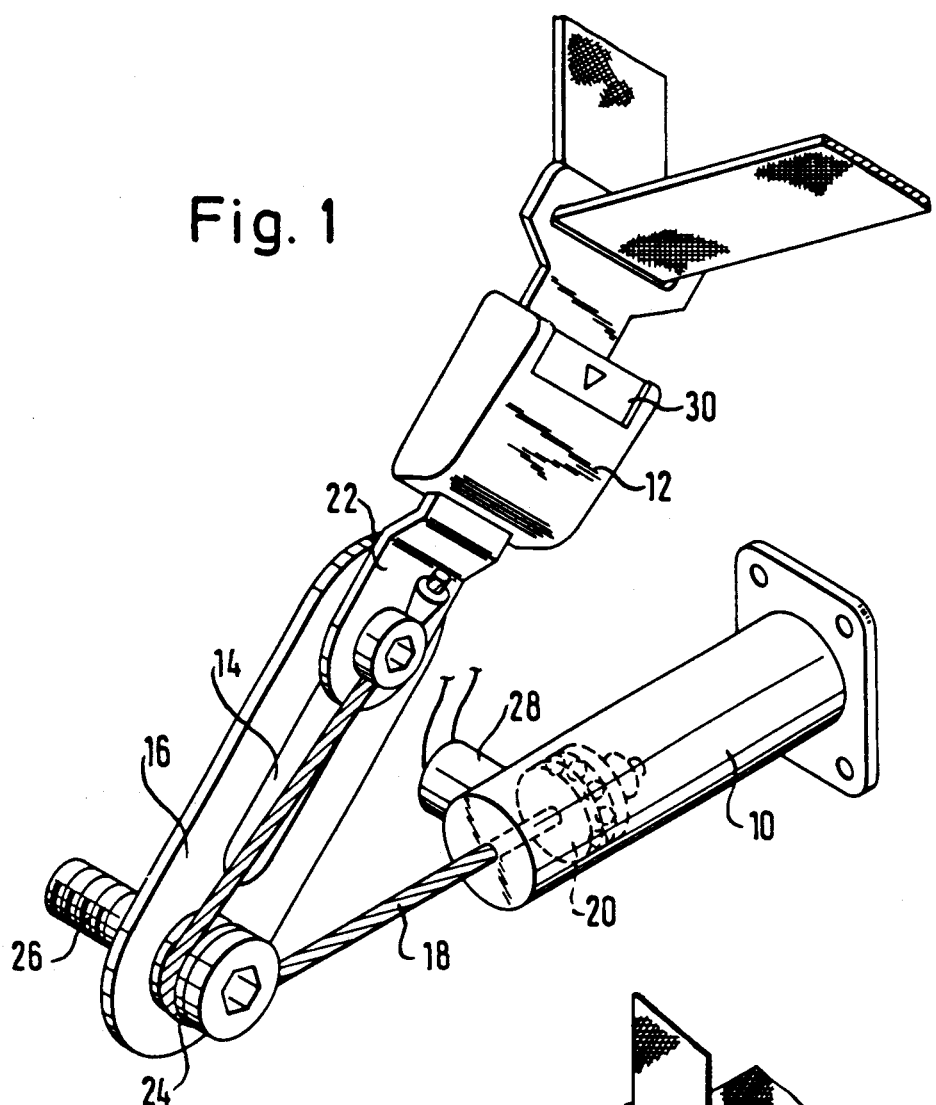
FIG. 1 is a schematic perspective view of a tightening means engaging a belt lock.

The tightening means shown in FIG. 1 consists of a pyrotechnical piston/cylinder tightening drive 10, the cylinder of which is anchored to the vehicle bodywork, and a longitudinal guide for the belt lock 12 in the form of an elongated anchoring plate 16 provided with a slot 14, a pulling cable 18 which connects the piston 20 to the securing fitting 22 of the belt lock and a guide pulley 24 via which the pulling cable 18 is led and which is mounted on a securing bolt 26 by means of which the anchoring plate 16 is mounted on the vehicle bodywork.

Figure 2:
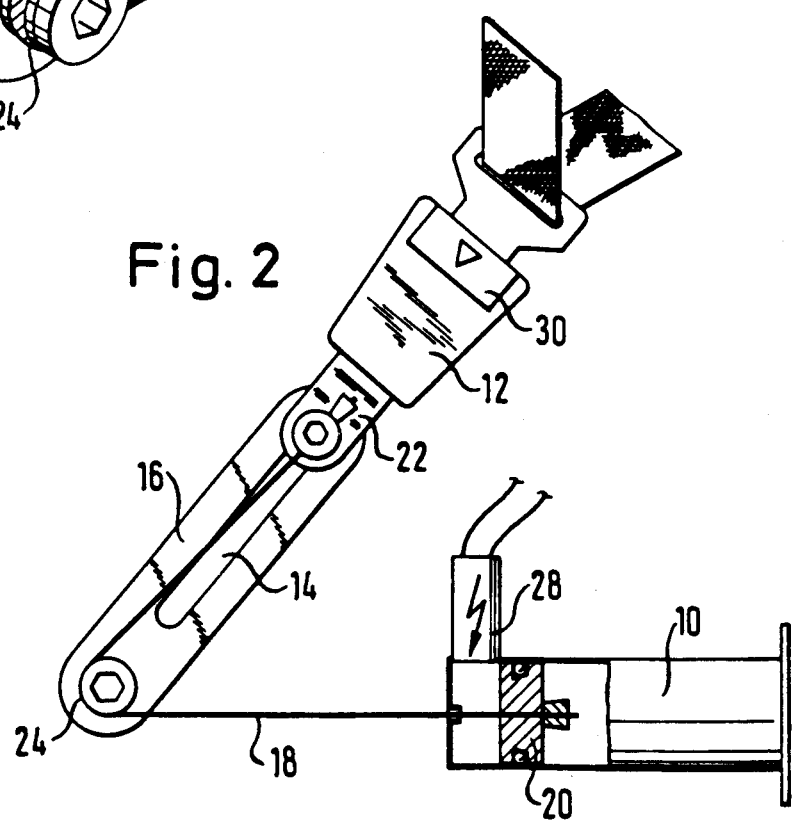
FIG. 2 is a partially sectioned side view of the tightening means.

FIGS. 1 and 2 show the tightening means in the unactivated state. As apparent from FIG. 2 the end side of the piston 20 can be subjected to pressurized gases generated by a pyrotechnical gas generator 28. Under the action of the pressurized gases the piston 20 is driven with an extremely high acceleration and via the pulling cable 18 and the securing fitting 22 pulls the belt lock 12 downwardly. At the lower end of the slot 14 the movement of the belt lock 12 is abruptly retarded. By a ratchet mechanism integrated into the piston 20 the belt lock 12 is prevented from moving in the direction of its starting position after tightening has taken place.

When the belt lock 12 is abruptly retarded at the end of the tightening stroke, at the release button 30 and the parts connected thereto high inertial forces occur which are directed in the direction of the release movement of the release button. The construction of the belt lock which will now be described with reference to FIGS. 3 to 10 prevents these inertial forces leading to unintentional opening of the belt lock.

The anchoring fitting 22 is connected by a rivet connection to the loadbearing part of the lock housing 32. Said housing 32 is surrounded by a cover in the form of a plastic dish 34. The lock housing 32 is provided with a bearing bracket which is drawn up in U-shape in plan view and between the two parallel legs 36, 38 of which a pivot latch 40 is mounted by means of a bearing pin 42. The release button 30 comprises two parallel arms 30A, 30B which extend into the lock interior and are provided at their free end with a guide slot through which the outer ends of the bearing pin 42 engage. The release button 30 is slidingly guided at the outer sides of the legs 36, 38.

The lock housing 32 is provided with a guide path 44 for an insert tongue 46 which comprises a detent opening 48. A control cam 50 of the pivot latch 40 projects into the guide path 44. The pivot latch 40 is further provided with a detent nose 52 in the region of its free end.

Between the two arms 30A, 30B of the release button 30 a blocking member 54 in the form of a steel plate is mounted above a lug 56 at the free end of the pivot latch 40. A pressure spring 58 bears with its one end on the blocking member 54 and its other end on a lever arm 60 of the pivot latch 40 which lies opposite the control cam 50.

Figure 3:
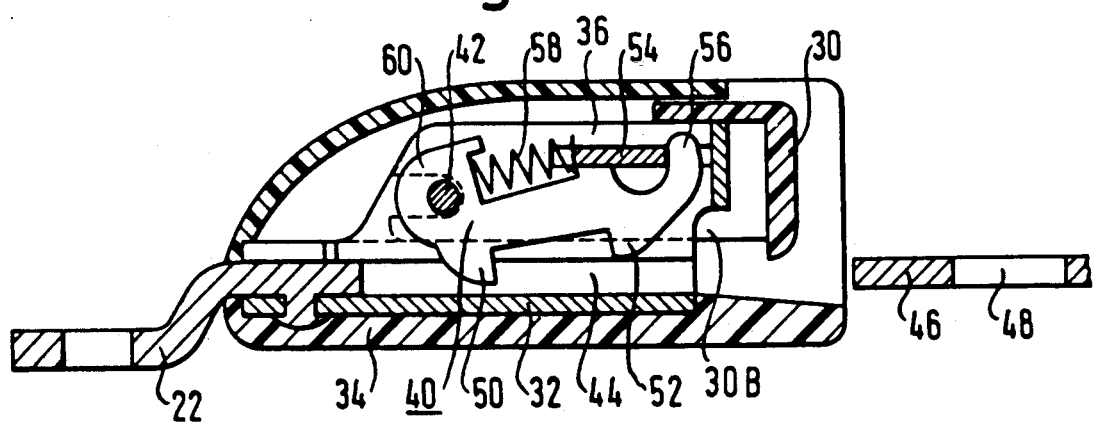
FIG. 3 is a longitudinal section of a belt lock according to the invention in the state when the release button is actuated.

In the position shown in FIG. 3 the lug 56 of the pivot latch 40 engages behind the front edge of the blocking member 54 so that the detent nose 52 is pivoted out of the guide path 44 by the pressure spring 58. The release button 30 is shown in its actuated position.

Figure 4:
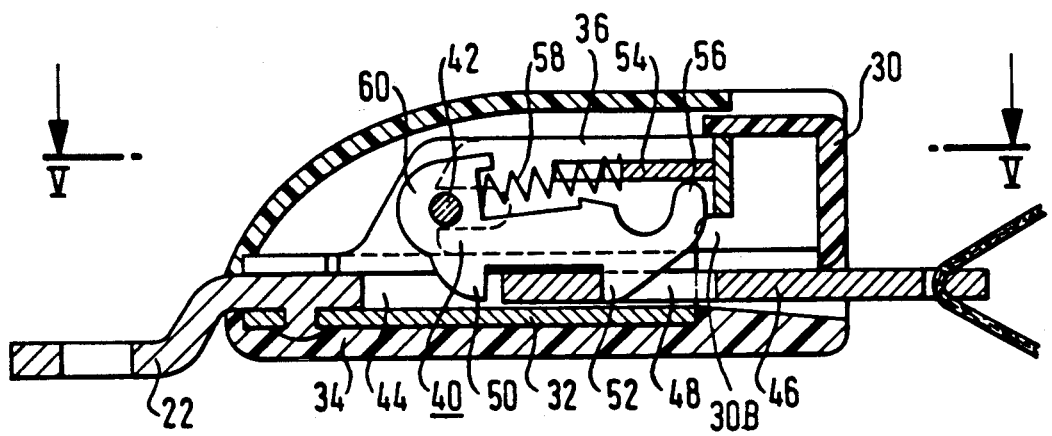
FIG. 4 is an analogous side view of the belt lock in the state when the insert tongue is inserted and locked.
Figure 5:
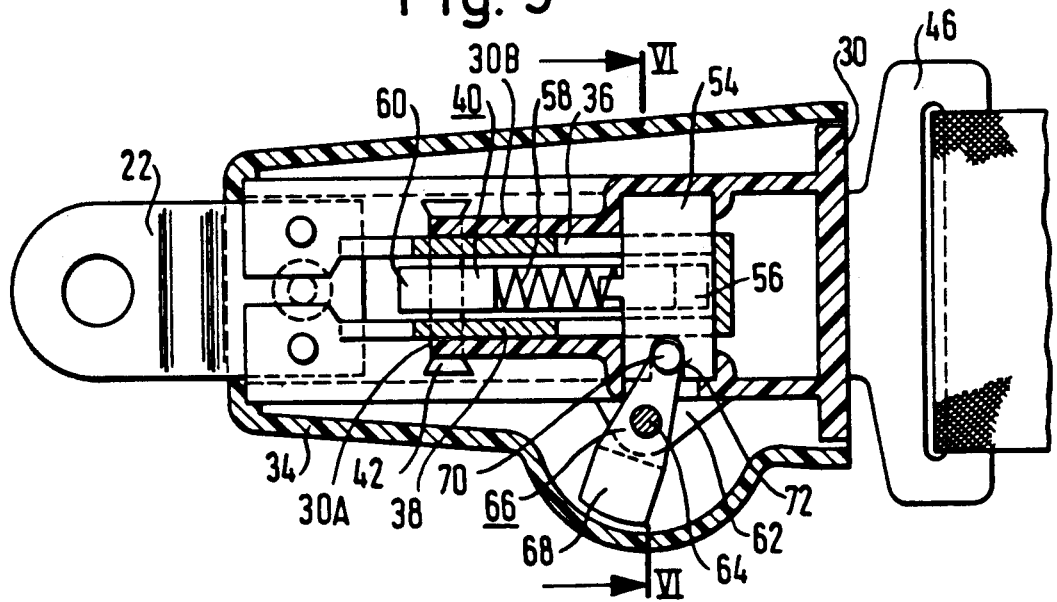
FIG. 5 is a sectional view of the belt lock along the line V—V of FIG. 4.

In the state shown in FIG. 4 the insert tongue 46 is inserted and the detent nose 52 is locked in the detent opening 48.

An extension 62 (FIGS. 5, 6 and 7) is laterally mounted on the lock housing 32. A two-armed lever 66 is pivotally mounted on said extension 62 by means of a bearing pin 64. A compensation mass 68 is secured to the one arm of said lever 66. The other arm of the lever 66 engages by means of a crank lug 70 in a recess 72 of the blocking member 54. The compensation mass 68 is thus connected in force-transmitting manner to the release button 30 and the blocking member 54. Since the compensation mass 68 is however located at the arm of the lever 66 remote from the release button 30 and the blocking member 54 the inertial forces generated by the compensation mass 68 act opposite to those caused by the release button 30, the blocking member 54 and all the masses coupled thereto.

The compensation mass 68 is so dimensioned that under all circumstances it prevents an opening of the belt lock due to inertial forces. Preferably, it is dimensioned somewhat greater than the sum of the masses of the release button 30, the blocking member 54 and all parts connected thereto.

Figure 9:
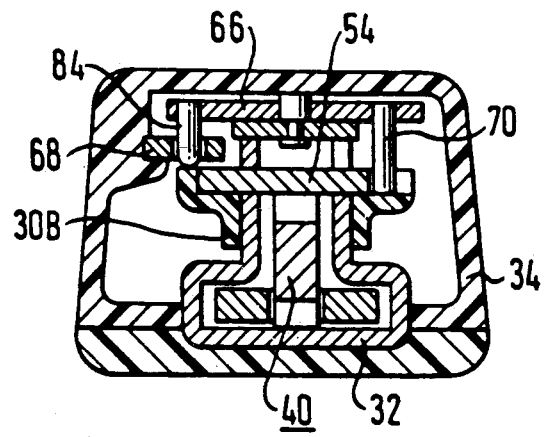
Figure 8:
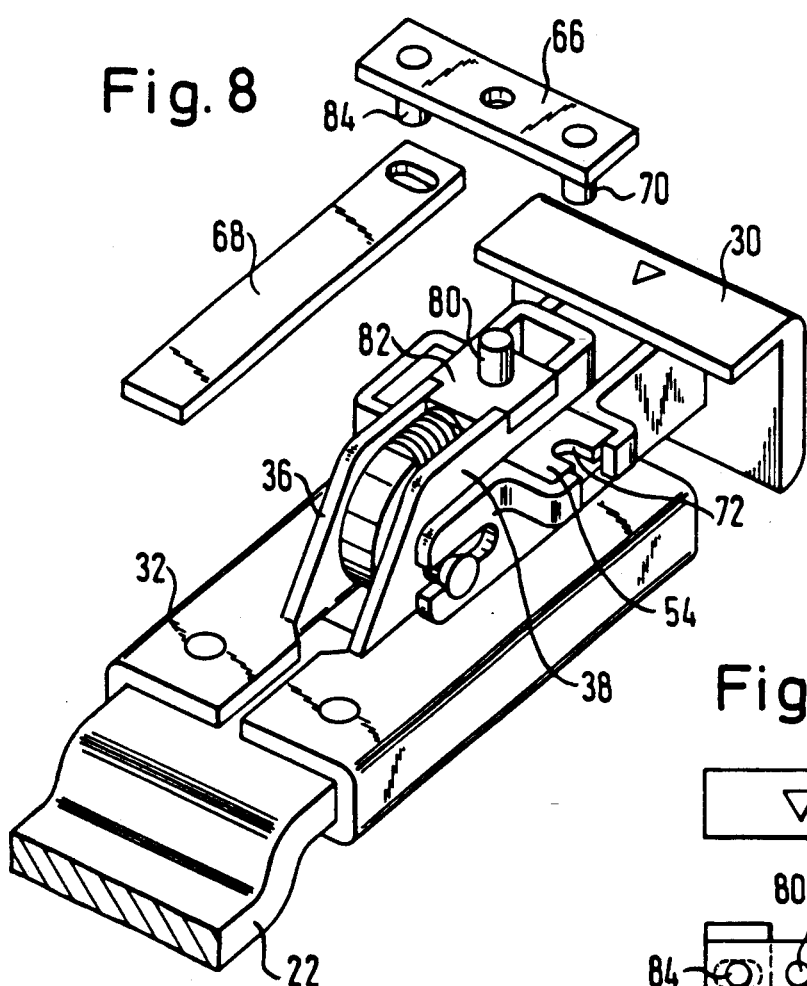

FIG. 8 shows a second embodiment of the belt lock according to the invention in exploded view; FIG. 9 shows said embodiment in cross-section and FIG. 10 illustrates the relative arrangement of the release button, the two-armed lever and the compensation mass.

This second embodiment differs from the previously described embodiment only in the arrangement and mounting of the two-armed lever 66 and the compensation mass 68. The two-armed lever is pivotally mounted in its centre on a bearing pin 80 which is secured in the centre of a plate 82 which connects the two legs 36, 38 of the lock housing 32 together at their upper edge. Said plate 82 lies opposite the blocking member 54. The compensation mass 68 is formed as an elongated plate and articulately connected to a crankpin 84 at the end of the one lever arm of the two-armed lever 66. The compensation mass 68 extends parallel to the longitudinal direction of the lock housing 32 and is mounted longitudinally displaceably on said housing.

Figure 10:
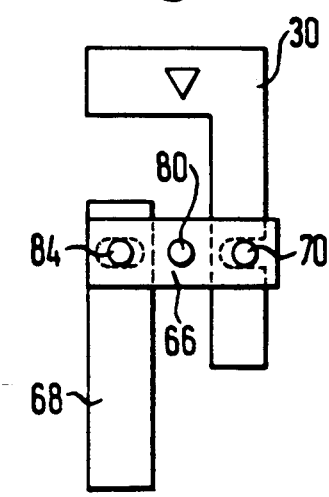

As apparent from FIG. 10 in this embodiment as well the two-armed lever 66 effects a reversal of the direction in which the mass inertial forces due to the compensation mass 68 are operative. The masses of the release button 30 and all the parts connected thereto are therefore compensated by the compensation mass 68.

The embodiment according to FIGS. 8, 9 and 10 permits easy accommodation of the compensation mass in a lock housing.

I claim:

1. In a vehicle having a bodywork and seats, a safety belt system comprising:
   a belt fitting having an insert tongue,
   a belt lock,
   an anchoring means for attachment to one of the vehicle bodywork and vehicle seat, and
   a tightening means operative between the belt lock and the anchoring means,
   the belt lock comprising:
   a housing provided with a guide path for the insert tongue,
   a detent opening in the insert tongue,
   a latch mounted in the housing and displaceably guided therein in a direction transverse to the guide path between a holding position in which the latch engages the detent opening of the insert tongue and a release position in which the latch is disengaged from said detent opening,
   a blocking member mounted in the housing and displaceably guided in parallel to the guide path between a holding position in which the blocking member maintains said latch in its holding position and a release position in which the blocking member disengages said latch to allow the latter to move to its release position,
   a manually operable release button mounted in the housing and likewise displaceably guided therein in parallel to the guide path, said release button being coupled to said blocking member to move the latter to its release position, whereby the latch is also moved to its release position out of engagement from the detent opening of the insert tongue,
   a two-armed lever pivotally mounted on said housing about a pin perpendicular to said guide path, said lever having a first arm mounting a compensation mass and a second arm in force-transmitting engagement with one of the release button and the blocking member, the improvement wherein the first arm of the two-armed lever has a bent portion formed by said compensation mass and extending perpendicularly to said guide path and laterally of said housing.

2. The improvement as set forth in claim 1, wherein:

the second arm of the two-armed lever has a bent portion, bent in opposite direction to the bent portion of said first arm, forming a crank lug, said one of the release button and the blocking member is provided with a recess, and said crank lug engages said recess.

3. The improvement as set forth in claim 1, wherein said housing comprises a load-bearing member, said load-bearing member being provided with a lateral extension adjacent said guide path, and said two-armed lever being pivotally mounted onto said lateral extension.

4. The improvement as set forth in claim 2, wherein said recess is disposed at an edge of the blocking member parallel to the guide path.

5. The improvement as set forth in claim 1, wherein the blocking member is a plate connected in form-locking manner to the release button.

6. The improvement as set forth in claim 1, wherein said housing comprises a load-bearing member, and said latch is a pivot latch mounted on the load-bearing member of the lock housing.

7. In a vehicle having a bodywork and seats, a safety belt system comprising:

a belt fitting having an insert tongue, a belt lock, an anchoring means for attachment to one of the vehicle bodywork and vehicle seat, and a tightening means operative between the belt lock and the anchoring means, the belt lock comprising:

a housing provided with a guide path for the insert tongue, a detent opening in the insert tongue, a latch mounted in the housing and displaceably guided therein in a direction transverse to the guide path between a holding position in which the latch engages the detent opening of the insert tongue and a release position in which the latch is disengaged from said detent opening, a blocking member mounted in the housing and displaceably guided in parallel to the guide path between a holding position in which the blocking member maintains said latch in its holding position and a release position in which the blocking member disengages said latch to allow the latter to move to its release position, a manually operable release button mounted in the housing and likewise displaceably guided therein in parallel to the guide path, said release button being coupled to said blocking member to move the latter to its release position, whereby the latch is also moved to its release position out of engagement from the detent opening of the insert tongue, a two-armed lever pivotally mounted on said housing about a pin perpendicular to said guide path, said lever having a first arm mounting a compensation mass and a second arm in force-transmitting engagement with one of the release button and the blocking member, the improvement wherein:

said housing comprises a load-bearing member, said two-armed lever is pivotally mounted onto said load-bearing member opposite to the blocking member, said compensation mass is articulately connected to the first arm of the two-armed lever, and said compensation mass is formed as an elongated plate and is displaceably mounted in said lock housing in parallel to said guide path.

8. The improvement as set forth in claim 1 or claim 7 wherein the tightening means is constructed as a piston and cylinder linear drive having a pyrotechnical gas generator for subjecting the piston to pressurized gas in the event of actuation of said pyrotechnical gas generator.

9. The improvement as set forth in claim 8, wherein the piston of the piston and cylinder linear drive is connected to said belt lock via a pulling cable, and said belt lock is displaceably guided in an elongated guide by means of a fitting.

10. The improvement as set forth in claim 9, wherein said pulling cable is deflected between the belt lock and the piston and cylinder linear drive.

* * * * *